US005781797A

United States Patent [19]

Crick et al.

[11] Patent Number: 5,781,797
[45] Date of Patent: Jul. 14, 1998

[54] METHOD AND SYSTEM FOR CONFIGURING DEVICE DRIVER BY SELECTING A PLURALITY OF COMPONENT DRIVERS TO BE INCLUDED IN THE DEVICE DRIVER

[75] Inventors: Andrew P. R. Crick; Mike Glass. both of Woodinville. Wash.; Thomas J. Shea. Santa Clara; Shishir Shah. Irvine, both of Calif.

[73] Assignee: Microsoft Corporation, Redmond, Wash.

[21] Appl. No.: 954,920

[22] Filed: Sep. 30, 1992

[51] Int. Cl.$^6$ .................................................. G06F 15/02
[52] U.S. Cl. ............................................................ 395/830
[58] Field of Search ................................ 395/275, 700, 395/712, 680–682, 882–885, 828, 830, 892, 651–653, 650, 500; 364/200, 900

[56] References Cited

U.S. PATENT DOCUMENTS

| | | | |
|---|---|---|---|
| 4,403,303 | 9/1983 | Howes et al. | 395/275 |
| 4,589,063 | 5/1986 | Shah et al. | 395/828 |
| 4,695,977 | 9/1987 | Hansen et al. | 364/900 |
| 4,701,848 | 10/1987 | Clyde | 395/681 |
| 4,866,663 | 9/1989 | Griffin | 364/900 |
| 4,910,691 | 3/1990 | Skeirik | 364/11 |
| 5,101,490 | 3/1992 | Getson, Jr. et al. | 364/200 |
| 5,123,098 | 6/1992 | Gunning et al. | 395/652 |
| 5,159,687 | 10/1992 | Richburg | 395/700 |
| 5,179,666 | 1/1993 | Rimmer et al. | 395/882 |
| 5,226,160 | 7/1993 | Waldron et al. | 395/685 |
| 5,265,252 | 11/1993 | Rawson, III et al. | 395/681 |
| 5,291,585 | 3/1994 | Sato et al. | 395/500 |
| 5,302,947 | 4/1994 | Fuller et al. | 340/825.34 |

(List continued on next page.)

FOREIGN PATENT DOCUMENTS

| | | |
|---|---|---|
| 58-217031 | 12/1983 | Japan . |
| 1-72203 | 3/1989 | Japan . |
| 1-88742 | 3/1989 | Japan . |

OTHER PUBLICATIONS

"OS/2 help", by EXE, VS, n11, p. 6(1), May 1991.
"Understanding device drivers in operating system/2", by Mizell, A.M., IBM Systems Journal, vol. 27, No. 2, pp.170–184, 1988.
"Data Compression algorithm for system initialisation" Rd 333008, Jan. 1992.
"Granting requests for sample device drivers and descriptions", by Puckett, Dale L., Rainbow, v5, n7, p. 236(14), Feb. 1986.
"Typesetting language standard search heats up", by Bridges Linda, PC Week, v3, n36, p. 158 (2), Sep. 9, 1986.

(List continued on next page.)

*Primary Examiner*—Moustafa M. Meky
*Attorney, Agent, or Firm*—Seed & Berry LLP

[57] ABSTRACT

A method and system for configuring and executing device drivers in a computer system is provided. In a preferred embodiment, the device drivers comprise a plurality of component drivers. Each component driver performs a function (e.g., disk caching) that may be used in accessing a device. The component drivers of a device driver are ordered from a top layer to a bottom layer. When accessing a device, the top layer component driver of the device driver is first invoked. Each component driver performs its function and invokes the next lower layer component driver. The bottom layer component driver interacts directly with the device. An operating system, preferably, dynamically configures the device drivers at computer system startup. The operating system has a plurality of component drivers that are available to be configured into a device driver. To configure a device driver, the operating system invokes each component driver to determine whether the component driver should be included as a layer in the device drive. If a component driver should be included, the component driver stores a reference to the component driver in a call-down table for the device driver. The call-down table stores the ordering of the component driver layers. When accessing the device, the operating system first invokes the component driver referenced by the top reference in the call-down table. Each component driver in turn invokes the component driver referenced by the next lower reference in the call-down table.

28 Claims, 10 Drawing Sheets

U.S. PATENT DOCUMENTS

| | | | |
|---|---|---|---|
| 5,307,491 | 4/1994 | Feriozi et al. | 395/681 |
| 5,317,723 | 5/1994 | Heap et al. | 395/500 |
| 5,325,532 | 6/1994 | Crosswy et al. | 395/652 |
| 5,353,411 | 10/1994 | Nakaosa et al. | 395/651 |
| 5,359,713 | 10/1994 | Moran et al. | 395/872 |
| 5,414,846 | 5/1995 | Lemble et al. | 395/651 |
| 5,414,850 | 5/1995 | Whiting | 395/681 |
| 5,430,845 | 7/1995 | Rimmer et al. | 395/681 |
| 5,432,941 | 7/1995 | Crick et al. | 395/651 |
| 5,459,867 | 10/1995 | Adams et al. | 395/681 |
| 5,465,364 | 11/1995 | Lathrop et al. | 395/681 |
| 5,469,571 | 11/1995 | Bunnell | 395/673 |
| 5,491,813 | 2/1996 | Bondy et al. | 395/500 |
| 5,497,492 | 3/1996 | Zbikowski et al. | 395/652 |
| 5,613,123 | 3/1997 | Tsang et al. | 395/651 |

OTHER PUBLICATIONS

"New Framework for device support in Berkeley Univ "... by Torek. C., 1990.

*Microsoft OS/2 Laddr Complaint Device Driver Specification of Version 1.0 for the OS/2 Laddr Device Driver Development Kit;* Copyright 1990–1991; pp. 1–105.

METHOD AND SYSTEM FOR CONFIGURING DEVICE DRIVER BY SELECTING A PLURALITY OF COMPONENT DRIVERS TO BE INCLUDED IN THE DEVICE DRIVER

TECHNICAL FIELD

The present invention relates generally to the field of device drivers and, more particularly, to a method and system for configuring and executing device drivers.

BACKGROUND OF THE INVENTION

A computer system typically is connected to various peripheral devices, which may include disk drives, tape drives, printers, and modems. The computer system has an operating system that provides an interface between an application program and these devices. The operating system receives from the application program a request to access one of the devices and translates this request to a request that will be understandable by that device. The operating system sends the translated request to the device and typically informs the application program when the request is complete.

The portion of the operating system that translates a request to access a device and controls communications with that device is typically referred to as a device driver. For example, an application program may request the operating system to read a file stored on a disk driver. The operating system would invoke a device driver provided for the disk drive and send it this read request. The disk device driver would translate the read request by determining the actual disk location at which the file is stored, and would send the read request to the disk drive. The disk drive would then service the read request by reading the disk at the determined actual disk location, and then inform the device driver upon completion. The device driver would then inform the application program that the request has been serviced.

FIG. 1 is a block diagram illustrating the use of a device driver in a computer system. The computer system comprises a computer 100 and a plurality of devices 113, 114, 115. The computer 100 includes various application programs 101 and an operating system 102. The application programs 101 request services of the devices through the operating system 102. The operating system 102 receives such a request and invokes an appropriate device driver 103, 104, 105 to service the request. The device driver 103, 104, 105 then translates the request and sends it to the device 113, 114, 115, respectively. It should be noted that, although a device driver can correspond to any number of devices, only one device for each device driver is shown for simplicity of explanation.

Prior device drivers typically have been developed by the manufacturer of each corresponding device. The developer of the operating system typically publishes a specification of the interface between the operating system and a device driver. The manufacturer of the device develops the device driver necessary to communicate with its corresponding device using this specification. Also, after developing the device driver, the manufacturer of the device will often add various features to the device driver to enhance the marketability of the device. For example, a manufacturer of a disk drive may provide a device driver with data compression, data encryption, or disk caching options. Unfortunately, as more options are added to the device driver, the device driver becomes more complex. As the complexity of a device driver increases, the more difficult it becomes for a manufacturer to modify and test the device driver. For example, the addition of data compression, data encryption or disk caching typically requires changes to be made throughout the device driver code in order to accommodate these options.

In addition, the complexity of distributing device drivers increases when the device manufacturer integrates third party software into its device driver. For example, if a third party develops a particularly efficient data compression program, the third party developer may sell the program to various device manufacturers. Each manufacturer would then integrate the data compression program into its own device driver. Once the integration is complete, each manufacturer would then distribute the new device driver directly to its customers or indirectly through the operating system developer when a new version of the operating system is released.

SUMMARY OF THE INVENTION

It is an object of the present invention to provide a method and system in which computer programs are dynamically configured.

It is another object of the present invention to provide a method and system in which device drivers can be configured to include new features without the need for the device manufacturer to integrate the new features.

It is another object of the present invention to provide a method and system in which new features developed by third parties can be dynamically configured into a device driver.

These and other objects, which will become apparent as the invention is more fully described below, are obtained by a method and system for configuring device drivers described as follows. In a preferred embodiment, the device drivers comprise a plurality of component drivers. Each component driver performs a function (e.g., disk caching) that may be used in accessing a device. The component drivers of a device driver are ordered from a top layer to a bottom layer. When accessing a device, the top layer component driver of the device driver is first invoked. Each component driver performs its function and invokes the next lower layer component driver. The bottom layer component driver interacts directly with the device. An operating system, preferably, dynamically configures the device drivers at computer system startup. The operating system has a plurality of component drivers that are available to be configured into a device driver. To configure a device driver, the operating system invokes each component driver to determine whether the component driver should be included as a layer in the device driver. If a component driver should be included, the component driver stores a reference to itself in a call-down table for the device driver. The call-down table stores the ordering of the component driver layers. When accessing the device, the operating system first invokes the component driver referenced by the top reference in the call-down table. Each component driver in turn invokes the component driver referenced by the next lower reference in the call-down table.

DETAILED DESCRIPTION OF THE INVENTION

Figure 1:
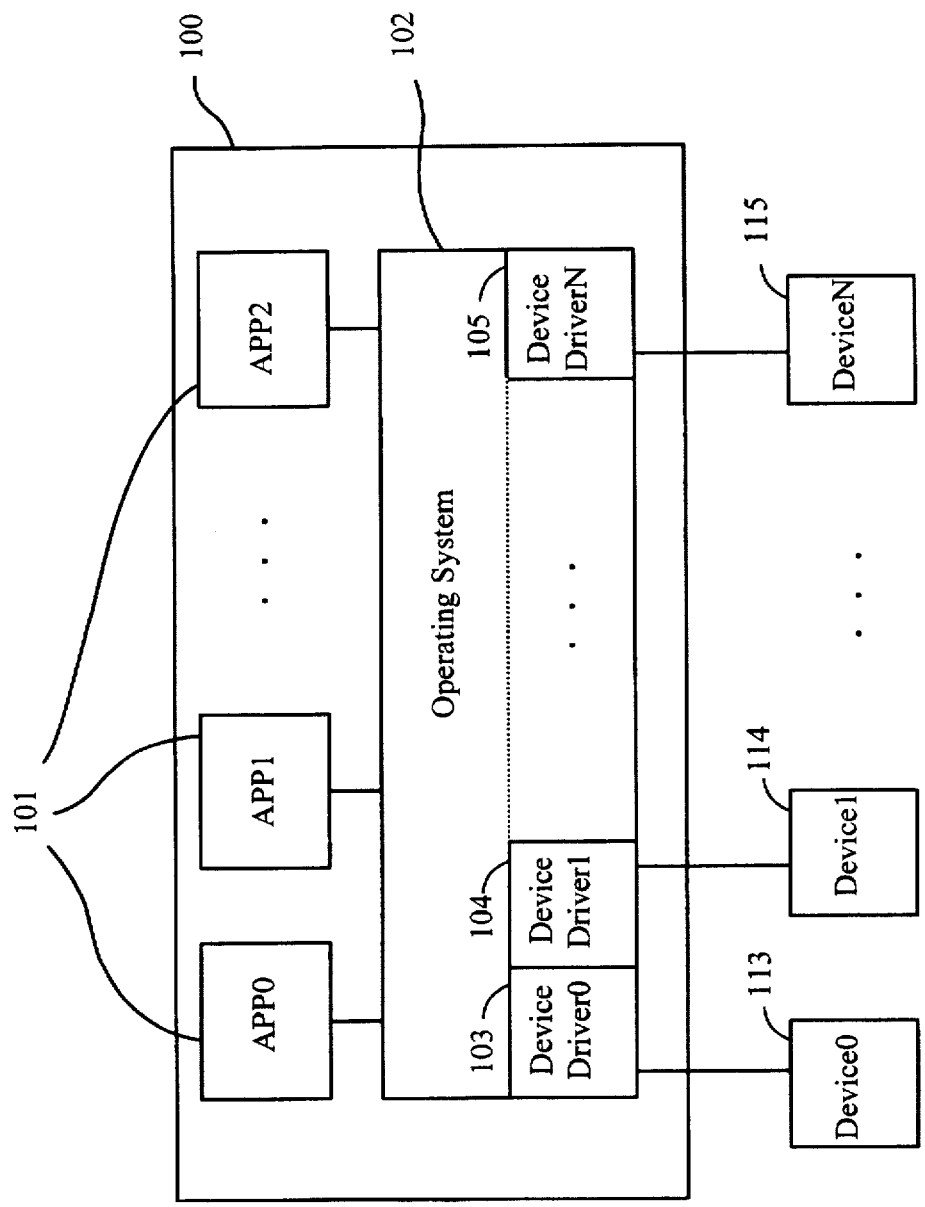
FIG. 1 is a block diagram illustrating the use of a device driver in a computer system.
Figure 2:
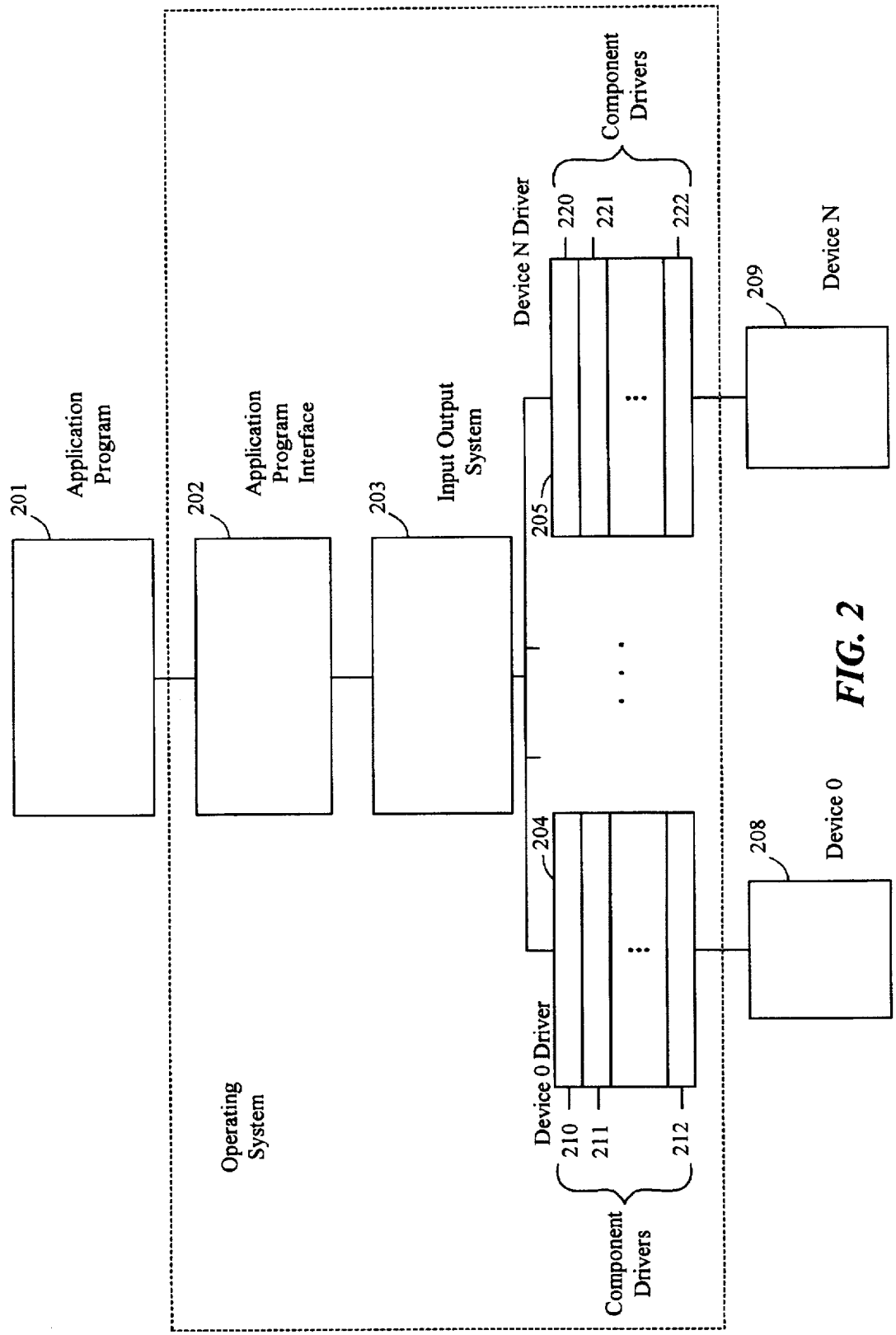
FIG. 2 is a block diagram illustrating components of the present invention.

The present invention provides a method and system for automatically configuring device drivers at computer startup. FIG. 2 is a block diagram illustrating components of the present invention. An application program 201 formulates I/O requests and passes the requests to the operating system through an application program interface 202. The application program interface 202 provides the application program with access to the operating system. When the application program interface 202 receives an I/O request, it invokes the input-output system (IOS), passing it the request. The input-output system determines which device driver 204, 205 can service the request. Device driver 204 comprises component drivers 210 and 211 through 212, and device driver 205 comprises component drivers 220 and 221 through 222. The component drivers are independently executable software routines. Within a device driver, the component drivers are organized in a layered manner. Component drivers 210 and 220 are the top layers and component drivers 212 and 222 are the bottom layers in their respective device drivers. Upon receiving the I/O request, the input-output system invokes the top layer component driver for the appropriate device driver. The top layer component driver performs component driver specific functions and invokes when appropriate the next lower layer component driver, the next lower layer component driver performs its own component driver specific functions and invokes when appropriate its next lower layer component driver, and so on.

Figure 9:
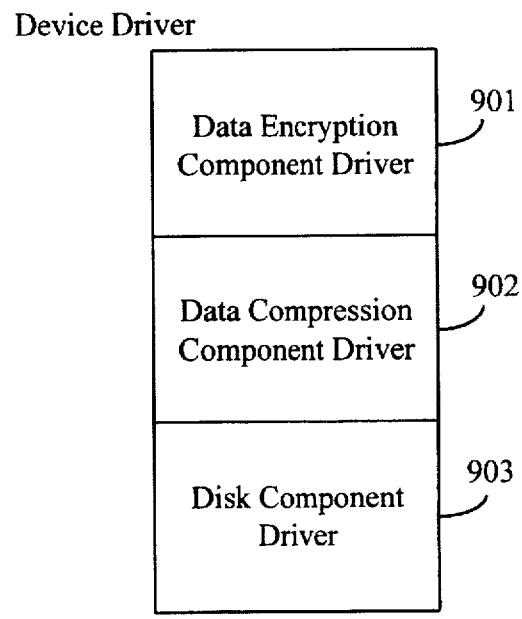
FIG. 9 is a block diagram showing a sample disk drive device driver.

FIG. 9 is a block diagram showing a sample disk drive device driver. The disk drive device driver would be provided, for example, as the device driver 204 if the device 208 were a disk drive. The device driver is implemented to perform synchronous I/O and includes a data encryption component driver 901, a data compression component driver 902, and a disk component driver 903. The data encryption component driver encrypts or decrypts data and passes requests to the data compression driver. The data compression component driver works in an analogous manner to the data encryption component driver. That is, the data compression component driver compresses or decompresses data and passes requests along to the disk component driver. The disk component driver controls the reading and writing of the data to the disk drive through a disk drive adapter.

Upon receiving an I/O request to access the disk drive, for example, the IOS invokes the data encryption component driver, passing it the request to write data. When requested to write data, the data encryption component driver encrypts the data and then invokes the data compression component driver, passing it the write request along with the encrypted data. The data compression component driver compresses the encrypted data and then invokes the disk component driver, passing it the write request along with the compressed data. In the case of the write request, the disk component driver 903 controls the disk drive to write the data to the disk. Upon completion, the component drivers each return to the next higher layer component driver, and the top layer component driver returns to the IOS.

Figure 3:
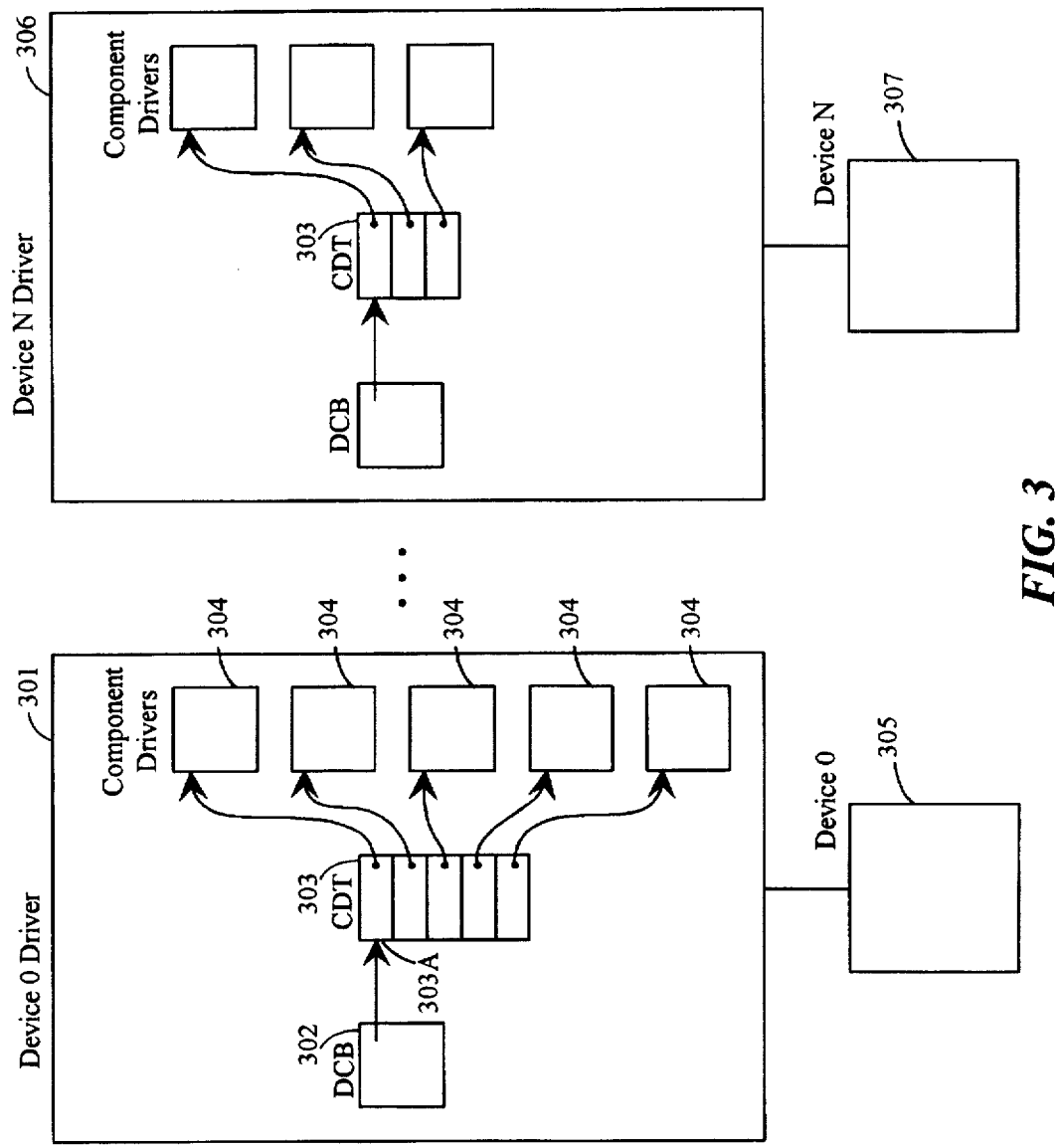
FIG. 3 is a block diagram illustrating the data structures that support the layering of component drivers.

FIG. 3 is a block diagram illustrating the data structures that support the layering of component drivers. Device driver 301 contains a device control block (DCB) 302, a call-down table (CDT) 303, and a plurality of component drivers 304. Device driver 301 corresponds to a device 305. The device control block 302 contains state information relating to device 305 and an entry pointer to the call-down table 303. The call-down table 303 contains entries that have pointers 303A that point to the component drivers 304 of the device driver 301. In a preferred embodiment, multiple devices are provided and other device drivers are provided which have a similar data structure as shown by device driver 306 and device 307. Each of the component drivers 304 is potentially available as a layer in any of the device drivers provided.

The call-down table specifies the ordering of the component drivers of a device driver. The top (first) entry in the call-down table points to the top (first) layer component driver. The second entry in the call-down table contains a pointer to the second layer component driver, and so on. The IOS invokes a device driver by retrieving the device control block for that device, retrieving the pointer to the call-down table from the device control block, retrieving the pointer to the top entry from the call-down table, storing in the device control block an entry pointer that points to the top entry in the call-down table, and invoking the top layer component driver pointed to by the retrieved top entry. Each component driver is passed the device control block.

A component driver uses the entry pointer stored in the device control block to determine which component driver is at the next lower layer. The component driver adjusts the entry pointer in the device control block to point to the entry for the next lower component driver and then invokes that component driver. The bottom layer component driver invokes no component driver, but rather interacts with the device directly.

Figure 4:
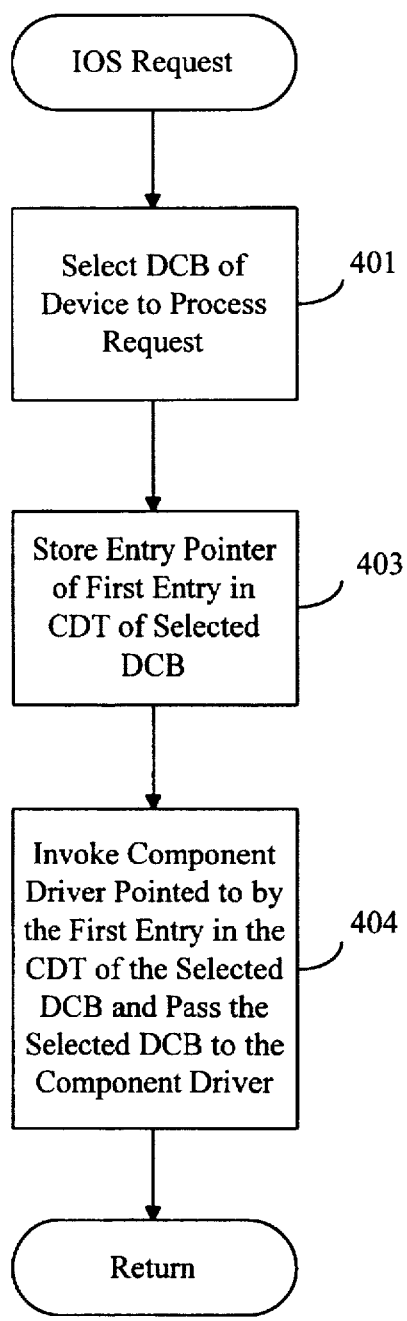
FIG. 4 is a flow diagram of the IOS request routine.

FIG. 4 is a flow diagram of the IOS request routine that processes requests from the application programming interface. The IOS request routine inputs an I/O request, determines which device driver should be invoked, and invokes the first component driver of the device driver. In step 401, the IOS routine selects the device control block of the device driver that is to process the request. In step 403, the IOS routine stores in the selected device control block an entry pointer to the first entry of the call-down table of the selected device control block. The storing of this entry pointer allows the first component driver to determine its corresponding entry in the call-down table for the selected device driver. In step 404, the IOS routine invokes the component driver pointed to by the first entry in the call-down table of the selected device control block, passing it a pointer to the selected device control block.

Figure 5:
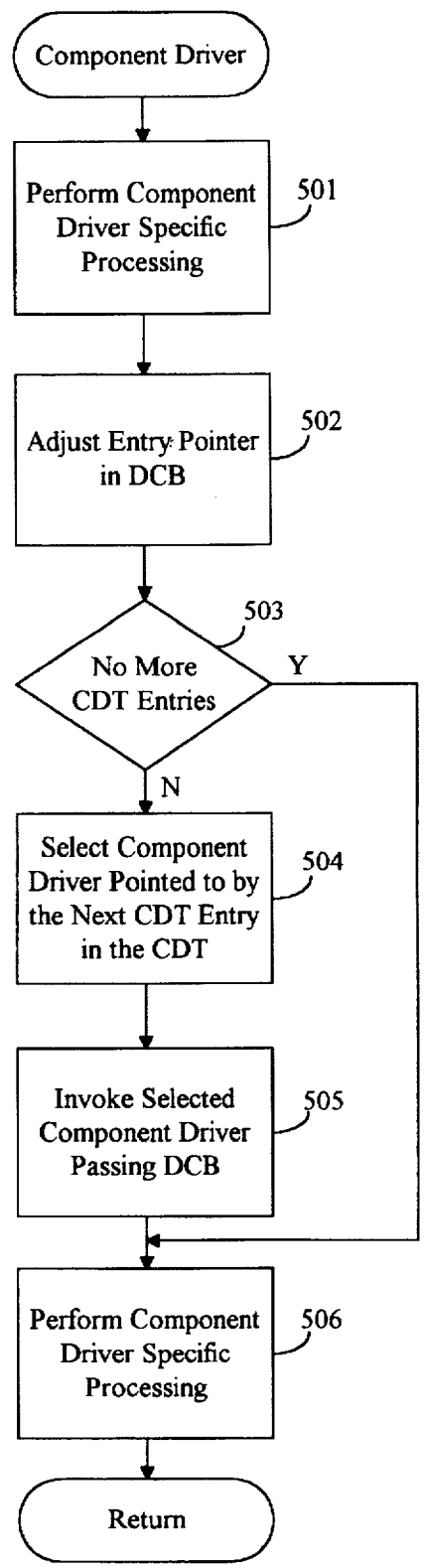
FIG. 5 is a data flow diagram of a typical component driver.

FIG. 5 is a flow diagram of a typical component driver. The component driver performs its component driver specific functions (e.g., data encryption and data compression) and invokes the component driver pointed to by the next call-down table entry. The component driver is passed the device control block. Each component driver can be included in several device drivers. That is, the call-down table entries for the several device drivers can contain a pointer to the same component driver. This permits the sharing of component driver code between device drivers. In step 501, the component driver performs component driver specific processing that is appropriate before invoking the next lower layer component driver. In step 502, the component driver adjusts the entry pointer in the device control block to point to the call-down table entry for the next component driver. In step 503, if there are no more call-down table entries, then this component driver is the bottom layer component driver and the component driver continues at step 506, else the component driver continues at step 504. In step 504, the component driver selects the next component driver by referencing the pointer to the next call-down table entry. In step 505, the component driver invokes the selected component driver, passing it the device control block. In step 506, the component driver performs component driver specific processing that is appropriate after the next lower component driver returns (e.g. data decompression or data decryption). The component driver then returns.

Figure 6:
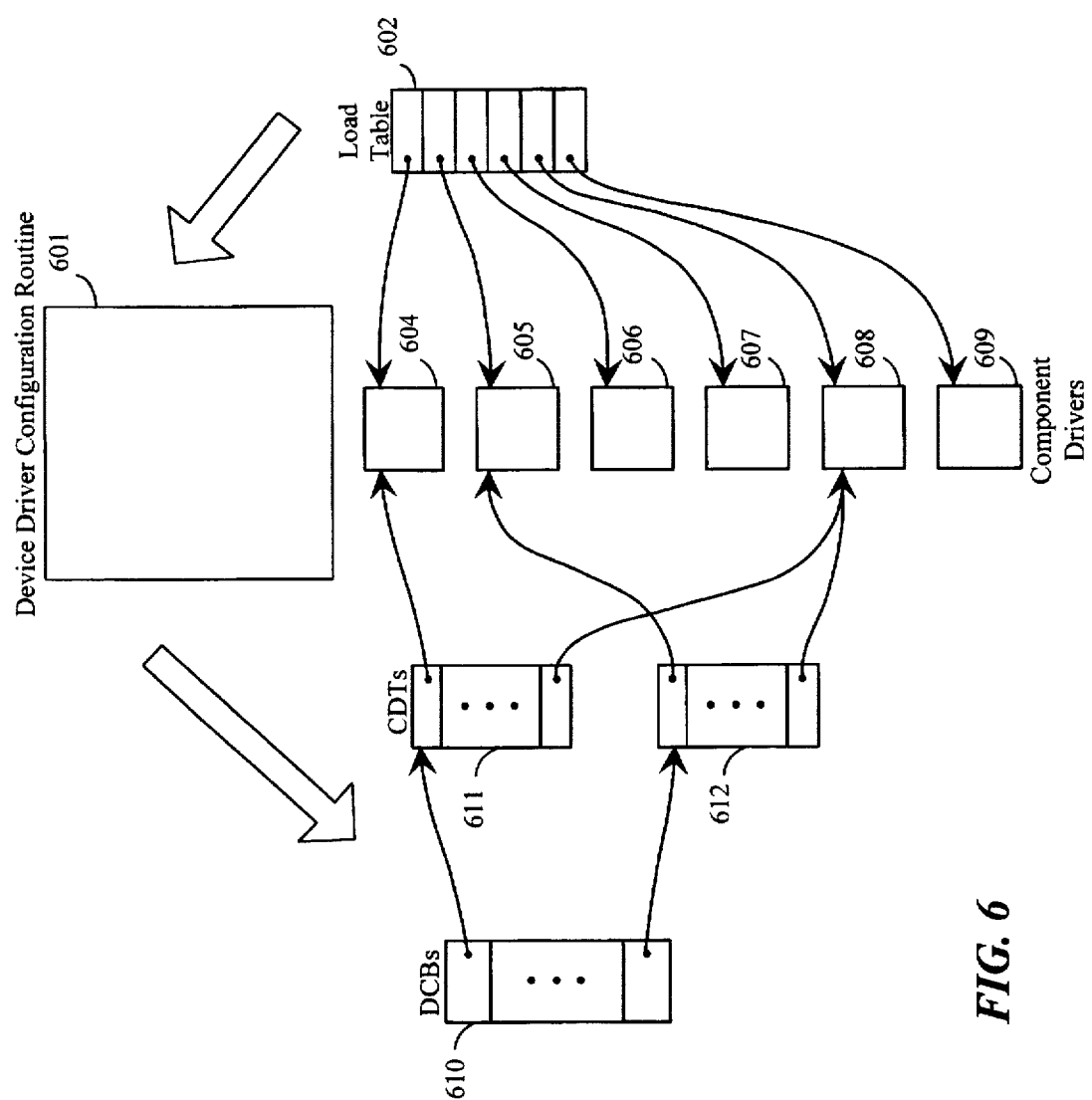
FIG. 6 is a block diagram illustrating the driver configuration routine of the IOS.

In a preferred embodiment, the present invention dynamically configures the device drivers at computer startup. FIG. 6 is a block diagram illustrating the driver configuration routine of the IOS. At computer startup, the operating system invokes the driver configuration routine 601. The driver configuration routine inputs a load table 602 and creates and initializes a device control block and a call-down table for each device. The load table 602 contains a list of pointers to component drivers 604-609 that are available to be configured into device drivers which have been predesignated by, for example, the manufacturer of the operating system. The driver configuration routine scans the load table and loads each component driver in order, starting with the component driver pointed to by the last load table entry. Once a component driver is loaded, the device driver routine invokes the component driver once for each device driver to be configured and passes the component driver the device control block for the device. The component driver then determines whether it should be included in the device driver for the device corresponding to the passed device control block. If the component driver determines that it should be included in the device driver, then the component driver inserts a pointer to itself. The call-down table functions as a stack in that new entries are pushed onto the top of the call-down table and existing entries are pushed down. The component driver determines whether it should be inserted into the call-down table based upon the state information in the device control block. For example, a component driver that provides disk caching would only insert a pointer to itself into a call-down table for a disk device driver.

Figure 7:
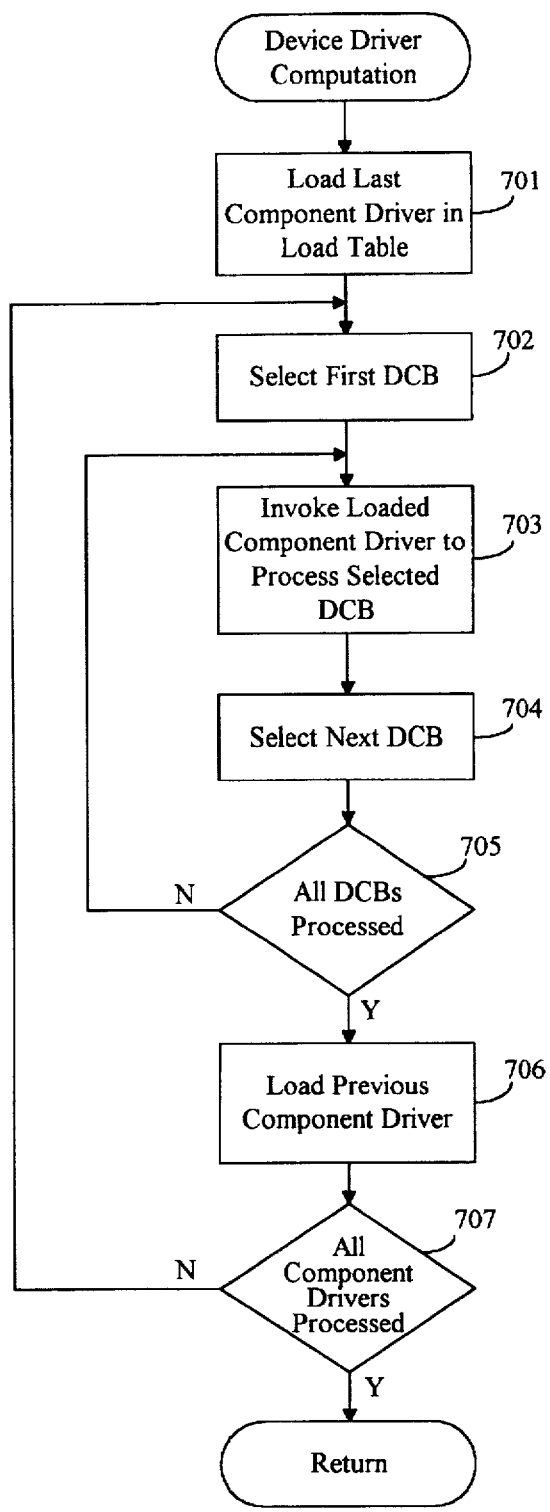
FIG. 7 is a flow diagram of a device driver configuration routine.

FIG. 7 is a flow diagram of a device driver configuration routine. For each component driver in the load table, the device driver configuration routine loads the component driver, passing it the device control block for each device. The component driver determines whether it should be included in each device driver and, if so, pushes an entry with a pointer to itself onto the call-down table. The component drivers pointed to by the call-down table are executed when access to the corresponding device is later requested. In step 701, the routine selects the component driver pointed to by the last entry in the load table. In a preferred embodiment, the load table is arranged so that component drivers that should be linked as lower layers are towards the end of the load table and, thus, would get loaded first. In steps 702 through 707, the routine loops loading each remaining component driver in the load table. In step 702, the routine selects the device control block for the first device. In steps 703 through 705, the routine loops invoking the loaded component driver once for each device, passing it the device control block for that device. One skilled in the art would appreciate that a component driver may have two entry points. One entry point would be used during device configuration and would be pointed to by the load table. The other entry point would be used during device access and would be pointed to by the call-down tables. Alternatively, each component driver would have only one entry point and be passed a parameter indicating whether it is being invoked for configuration or device access.

In step 703, the routine invokes the loaded component driver to process the selected device control block. In processing the device control block, the component driver determines whether to link into the call-down table based on the state information in the device control block. For example, the component driver for a disk drive of a particular type would determine whether the state information indicates that a disk of that particular type is the device corresponding to the device control block. If so, the component driver for the disk driver would link into the call-down table. In step 704, the routine selects the next device control block. In step 705, if all device control blocks have been processed by the loaded component driver, then the routine continues at step 706, else the routine continues to step 703. In step 706, the routine loads the component driver pointed to by the previous entry in the load table. In step 707, if all component drivers pointed to by the load table have been processed, then the routine returns, else the routine loops to step 702.

Figure 8A:
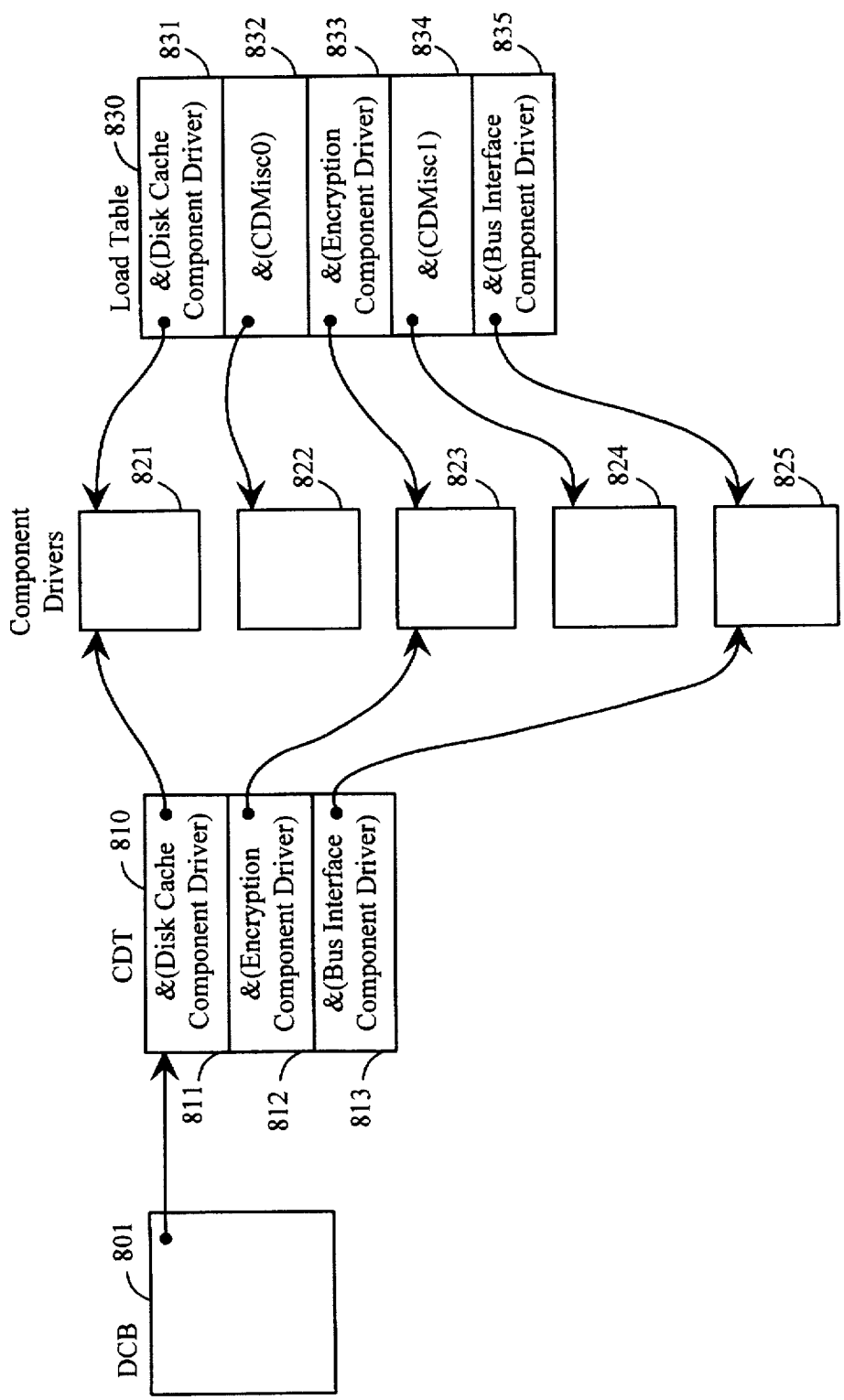
FIGS. 8A and 8B are block diagrams illustrating sample configurations of various device drivers.
Figure 8B:
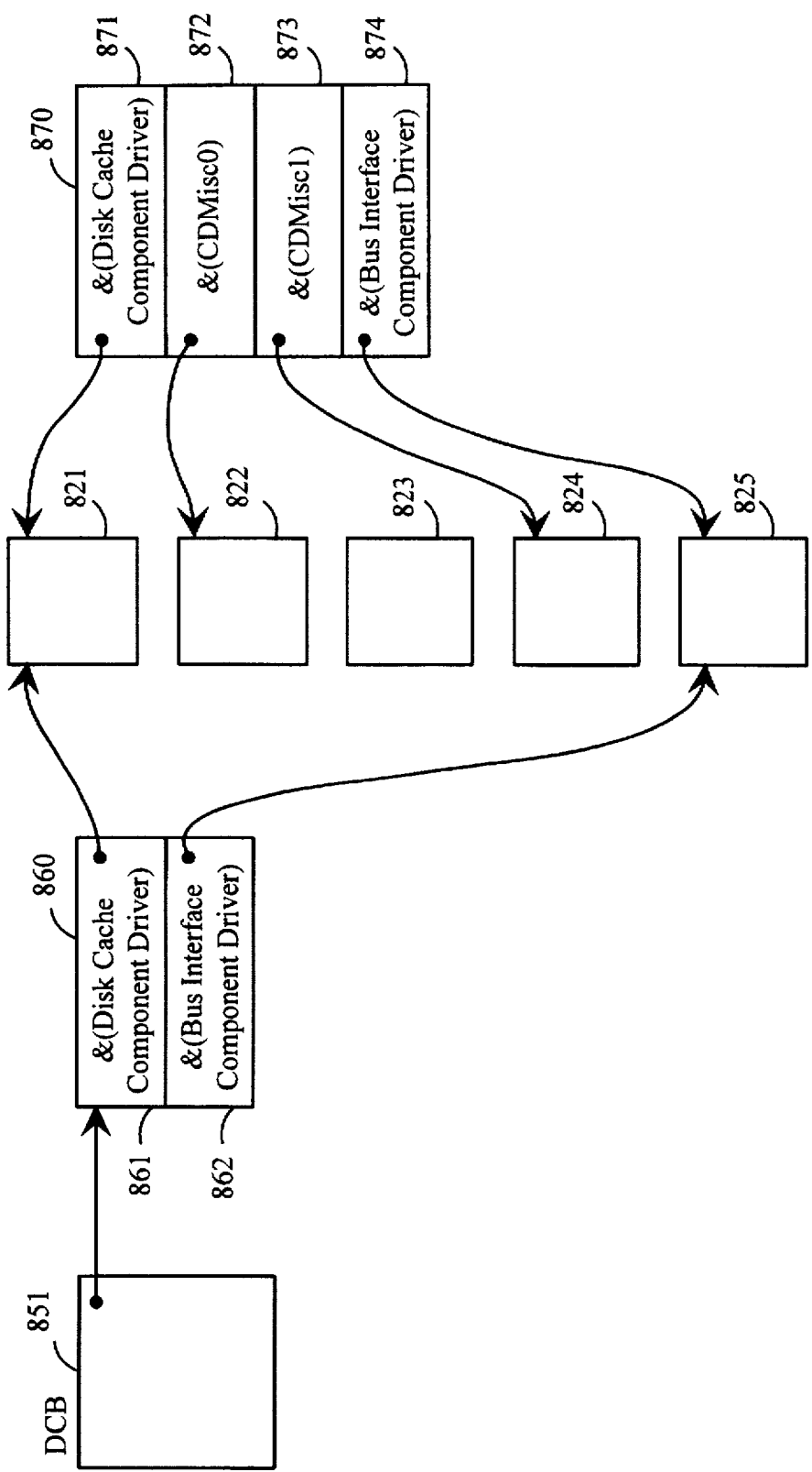

FIGS. 8A and 8B are block diagrams illustrating sample configurations of various disk device drivers. Various such configurations can be made by designating various component drivers in the load table. In FIG. 8A, the device driver provides disk caching and data encryption. In FIG. 8B, the device driver provides disk caching but not data encryption. At computer startup, the load table 830 contains a pointer 831 to disk cache component driver 821, a pointer 832 to a miscellaneous component driver 822, a pointer 833 to a data encryption component driver 823, a pointer 834 to a miscellaneous component driver 824, and a pointer 835 to a disk component driver 825. The configuration routine invokes each component driver pointed to by the load table, passing it the device control block 801 for the disk drive. Each component driver determines whether it should be part of the disk device driver and, if so, loads a pointer to itself into the call-down table 810. After configuration of the disk drive device is complete, the call-down table 810 contains a pointer 811 to the disk cache component driver 821, a pointer 812 to the data encryption driver 823, and a pointer 813 to the disk component driver 825. In this example, the miscellaneous component drivers 822 and 824 determined that they should not be part of the disk drive device driver.

FIG. 8B illustrates how the disk device driver can be configured without the data encryption component driver. The load table 870 contains the same data as load table 830 except it no longer contains a pointer to the data encryption component driver 823. At system boot-up, the device driver configuration routine loads each component driver that is in load table 870. Since the data encryption component driver is not pointed to by the load table 870, a pointer to it is not loaded into the call-down table 860. Thus, an end user can control the configuration of the device drivers by modifying the load table.

Although the present invention has been described in terms of a preferred embodiment, it is not intended that the invention be limited to these embodiments. Modifications within the spirit of the invention will be apparent to those skilled in the art. The scope of the present invention is defined in the claims which follow.

We claim:

1. A method in a computer system of configuring a device driver for controlling access to a device, the method comprising the computer-implemented steps of:
 defining a multiplicity of component drivers, each component driver for performing a function of a device driver; and
 with the computer system, selecting a plurality of the component drivers to be included in the device driver, wherein the selected component drivers compose a configured device driver.

2. The method of claim 1 including the step of organizing the selected component drivers into layers composing the configured device driver.

3. The method of claim 1 or 2 wherein the step of selecting a plurality of component drivers to be included in the device driver invokes a component driver so that the component driver determines whether it should be selected to be included in the device driver.

4. The method of claim 1 or 2 wherein a component driver is selected to be included in the device driver based on device-specific information.

5. The method of claim 1 or 2 wherein a component driver is included in a plurality of device drivers.

6. The method of claim 2 wherein the step of organizing the selected component drivers stores a reference to each selected component driver in an entry in a call-down table, the table having an entry for each layer within the configured device driver, further comprising the steps of, under the control of each selected component driver except the selected component driver having a last entry in the call-down table, in response to the invocation of the device driver:
 invoking the selected component driver having the next entry in the call-down table, and
 after the component driver having the next entry in the call-down table completes its execution, returning from its invocation.

7. The method of claim 1 wherein the defining step includes the step of defining a compression component driver for compressing data, and wherein the selecting step includes the step of selecting the compression component driver to be included in the device driver.

8. The method of claim 1 wherein the defining step includes the step of defining a encryption component driver for encrypting data, and wherein the selecting step includes the step of selecting the encryption component driver to be included in the device driver.

9. A method in a computer system of executing a device driver for controlling access to a device, the device driver having component drivers, the component drivers being ordered from a top layer to a bottom layer, a reference to each component driver being contained in an ordered call-down table, the method comprising the steps of:
 invoking the top layer component driver when accessing the device; and
 for each component driver except for the bottom layer component driver, under the control of the component driver, invoking a next lower layer component driver upon completion of the component driver by retrieving the reference to the next lower layer component driver from the call-down table.

10. The method of claim 9 wherein the step of invoking the next ordered component driver is suppressed based on device-specific information.

11. A method in a computer system of configuring and executing a device driver for controlling access to a device, the method comprising the steps of:
 organizing a plurality of component drivers as layers in the device driver by storing references to the component drivers in a call-down table; and
 invoking each of the plurality of component drivers each time the device is accessed by retrieving the references from the call-down table.

12. The method of claim 11 wherein the component drivers are ordered from a top layer to a bottom layer and wherein each component driver invokes a next lower layer component driver using a reference stored in the call-down table.

13. The method of claim 11 where in the plurality of component drivers includes a component driver for compressing data, and wherein the organizing step includes the step of storing a reference to the component driver for compressing data in the call-down table, and wherein the invoking step includes the step of retrieving the reference to the component driver for compressing data from the call-down table.

14. The method of claim 11 where in the plurality of component drivers includes a component driver for encrypting data, and wherein the organizing step includes the step of storing a reference to the component driver for encrypting data in the call-down table, and wherein the invoking step includes the step of retrieving the reference to the component driver for encrypting data from the call-down table.

15. A computer system for configuring a device driver for controlling access to a device, the system comprising:
 a multiplicity of component drivers, each component driver for performing a function of a device driver; and
 means for selecting a plurality of the component drivers to be included in the device driver, wherein the selected component drivers compose a configured device driver.

16. The computer system of claim 15 including means for organizing selected component drivers into layers composing the configured device driver.

17. A computer system for executing a device driver for controlling access to a device, the device driver having component drivers, the component drivers being ordered from a top layer to a bottom layer, a reference to each component driver being contained in a call-down table the computer system comprising:
 means for invoking the top layer component driver when accessing the device; and
 means, within each component driver except for the bottom layer component driver, for invoking the next lower layer component driver, including means for retrieving the reference to the next lower layer component driver from the call-down table.

18. A computer method of configuring and executing a device driver for controlling access to a device, the method comprising the steps of:
 for each component driver referenced in a load table:
  loading the component driver,
  passing to the loaded component driver a device control block of the device, and
  linking the loaded component driver into a call-down table based on device-specific information contained in the device control block; and
 invoking each component driver linked into the call-down table when accessing the device.

19. The method according to claim 18, wherein each invoked component driver invokes a next component driver linked in the call-down table.

20. A computer-readable memory containing a call-down table defining an invokable device driver dynamically configured from selected independent component drivers, the call-down table comprising a reference to each selected component driver, the references arranged in the order that the selected component drivers are to be invoked each time the configured device driver is invoked.

21. A method in a computer system for dynamically constructing a device driver, comprising the steps of:

retrieving an ordered list of available component drivers; and for each available component driver, in the order of the retrieved list:

calling the component driver to determine whether the component driver should be incorporated in the device driver; and if the component driver determines that it should be incorporated in the device driver, appending a reference to the component to a call-down table that may be used to invoke the constructed device driver.

22. The method of claim 21 wherein the call-down table comprises an ordered list of references to component drivers of the constructed device driver, further comprising the steps of:

receiving a request to invoke the device driver;

in response to the received request, using the first reference in the call-down table to invoke the component driver to which it refers; and for each component driver except the component driver referred to by the last reference in the call-down table, under the control of the component driver, using the reference following the reference to the component driver in the call-down table to invoke the next component driver of the device driver.

23. The method of claim 22, further including the steps of:

for each component driver, returning from its invocation when its processing is complete; and for at least one of the component drivers, performing additional processing after the component driver that it invoked returns and before returning from its own invocation.

24. The method of claim 21, further comprising the step of, in response to a user request, removing a component driver from the list of available component drivers, thereby rendering the removed component driver unavailable for inclusion in the device driver.

25. The method of claim 21, further comprising the step of, in response to a user request, adding a new component driver to the list of available component drivers, thereby making the new component driver available for inclusion in the device driver.

26. An instance of computer-readable media that causes a computer system to dynamically construct a device driver by performing the steps of:

retrieving an ordered list of available component drivers; and for each available component driver, in the order of the retrieved list:

calling the component driver to determine whether the component driver should be incorporated in the device driver; and if the component driver determines that it should be incorporated in the device driver, appending a reference to the component to a call-down table that may be used to invoke the constructed device driver.

27. The instance of computer-readable media of claim 26 wherein the contents of the instance of computer-readable media further cause the computer system to perform the steps of:

receiving a request to invoke the device driver;

in response to the received request, using the first reference in the call-down table to invoke the component driver to which it refers; and for each component driver except the component driver referred to by the last reference in the call-down table, under the control of the component driver, using the reference following the reference to the component driver in the call-down table to invoke the next component driver of the device driver.

28. The instance of computer-readable media of claim 27 wherein the contents of the instance of computer-readable media further cause the computer system to perform the steps of:

for each component driver, returning from its invocation when its processing is complete; and for at least one of the component drivers, performing additional processing after the component driver that it invoked returns and before returning from its own invocation.

* * * * *